United States Patent
Chen

(10) Patent No.: US 7,499,483 B2
(45) Date of Patent: Mar. 3, 2009

(54) RECEIVER CAPABLE OF ENHANCING RECEIVING EFFICIENCY IN A CODE DIVISION MULTIPLE ACCESS COMMUNICATION SYSTEM

(75) Inventor: An-Bang Chen, Kao-Hsiung Hsien (TW)

(73) Assignee: Lite-On Technology Corp., Neihu, Taipei (TW)

( * ) Notice: Subject to any disclaimer, the term of this patent is extended or adjusted under 35 U.S.C. 154(b) by 581 days.

(21) Appl. No.: 11/278,549

(22) Filed: Apr. 4, 2006

(65) Prior Publication Data

US 2007/0165701 A1 Jul. 19, 2007

(30) Foreign Application Priority Data

Jan. 16, 2006 (TW) .............. 95101618 A

(51) Int. Cl.
H04B 1/00 (2006.01)
(52) U.S. Cl. .............. 375/147; 375/136; 375/142; 375/150; 375/343
(58) Field of Classification Search .............. 375/136, 375/147, 142, 150, 343
See application file for complete search history.

(56) References Cited

U.S. PATENT DOCUMENTS

| 6,330,271 B1 | 12/2001 | Klang |
| 6,771,625 B1 | 8/2004 | Beal |
| 2003/0218568 A1 | 11/2003 | Kober |
| 2005/0163250 A1* | 7/2005 | McCallister ............ 375/296 |

FOREIGN PATENT DOCUMENTS

| EP | 1091501 A1 | 4/2001 |
| GB | 2285371 A | 7/1995 |
| GB | 2377128 A | 12/2002 |
| TW | 466848 | 12/2001 |
| TW | 480837 | 3/2002 |
| WO | WO0223751 A1 | 3/2002 |
| WO | WO0241515 A2 | 5/2002 |

* cited by examiner

Primary Examiner—Curtis B Odom
(74) Attorney, Agent, or Firm—Winston Hsu

(57) ABSTRACT

A receiver capable of enhancing receiving efficiency in a code division multiple access communication system includes a signal reception end for receiving signals, a data output unit for outputting a plurality of data streams corresponding to a plurality of codes according to signals received by the signal reception end, a control unit for outputting a data stream having maximum signal power when an amount of the plurality of data streams is smaller than a first value, a first multiplication unit for multiplying signals received by the signal reception end with the data stream outputted from the control unit, a high pass filter unit for discarding a DC portion of signals outputted from the first multiplication unit, and a second multiplication unit for multiplying the data stream outputted from the control unit with signals outputted from the high pass filtering unit and outputting a multiplied result to the signal reception end.

8 Claims, 3 Drawing Sheets

RECEIVER CAPABLE OF ENHANCING RECEIVING EFFICIENCY IN A CODE DIVISION MULTIPLE ACCESS COMMUNICATION SYSTEM

BACKGROUND OF THE INVENTION

1. Field of the Invention

The present invention provides a receiver of a code division multiple access communication system, and more particularly, a receiver capable of enhancing receiving efficiency.

2. Description of the Prior Art

In the scope of wireless communication technologies, code division multiple access (CDMA) technology is a spread-spectrum communication technology, which has advantages, such as anti-interference, multipath rejection, multiple access, etc., to enhance signal reliability and secrecy, and can provide a channel for multiple users. The CDMA technology uses pseudo-random (PN) codes to broaden a bandwidth of modulated signals, so as to hide the modulated signals in the environment as noise. Therefore, the CDMA technology can protect transmitted signals from wiretapping, and is utilized broadly in wireless communication systems, such as the $3^{rd}$ generation mobile communication system, the global positioning system, etc.

In a CDMA communication system, a server device, or transmitting end, radios to user equipment using different base stations. Obviously, distances between the user equipment and the base stations are not same, and signals between the user equipment and the base stations may be interfered with by landforms, surface features, etc., which makes the user equipment suffer from a near-far problem. The near-far problem means that among signals outputted from the base stations, signals having lower power are interfered with by signals having higher power, causing the user equipment to be unable to lock the signals having lower power. In a 3G communications system, the prior art outputs a power control command for controlling signal power of each base station through a physical layer protocol, so that signals received by the user equipment from different base stations have the same power toward the user equipment, and therefore the near-far problem can be solved. However, a GPS radios positioning signals from satellites using a one-way ranging method, so a GPS receiver cannot control signal power of the satellites, and suffers the near-far problem, and cause the receiver to not be able to locate positions and navigate correctly.

The GPS detects positions according to radio waves and time differences between transmitters and a receiver, and the receiver can provide exact information of latitude, altitude, speed, and time based on ranging codes from the transmitter. The ranging codes are C/A(coarse/acquisition), and P code (precision codes). The C/A codes are provided for general users, and provide lower precision of positioning than the P codes. The P codes are constructed by shorter chips, and provided for military uses, which will not be mentioned further. In the GPS, each satellite has a unique C/A code for acquisition and, most important, navigation data. In the satellite, the navigation data undergoes a convolution operation with the C/A code, and is modulated with a carrier. The navigation data includes ephemeris data, almanac data, launch time of the navigation data, timing calibration data, status of all satellites, propagation delay parameters of ionosphere, UTC parameters, etc.

The GPS receiver calculates positions according to a triangular positioning theorem. When the receiver receives signals from single satellite, the receiver can calculate a position data with a microprocessor to find out how far and where is the satellite. When there are two available satellites, the receiver can calculate a circle range formed by intersection of two sphere signals provided by the satellites. When there are three available satellites, two intersection points are formed in three sphere signals provided by the satellites, and one is on the earth, and the other is in space beyond the atmosphere, so that the receiver can find out longitude and latitude. Furthermore, when there are four available satellites, the receiver can find out longitude, latitude, and altitude. Therefore, the receiver requires four satellite signals for correct positioning.

If one satellite signal received by the receiver has power higher than other satellite signals received by the receiver, the receiver suffers the near-far problem. As a result, the receiver can only lock on the satellite signal having maximum power. Since the GPS receiver requires four satellite signals, the receiver cannot work properly when suffering from the near-far problem. For example, when a user navigates using a vehicle GPS receiver in downtown, signals from satellites may be interfered with by cloud layers, the windshield of the car, or buildings, which result in effects of propagation loss, multipath propagation, shadowing, fading, delay spread, etc., and lead to the near-far problem.

SUMMARY OF THE INVENTION

It is therefore a primary objective of the claimed invention to provide a receiver capable of enhancing receiving efficiency in a code division multiple access communication system.

An exemplary embodiment of a receiver capable of enhancing receiving efficiency in a code division multiple access communication system comprises a signal reception end for receiving signals, a data output unit for outputting a plurality of data streams corresponding to a plurality of codes according to signals received by the signal reception end, a control unit for outputting a data stream having maximum signal power when an amount of the plurality of data streams is smaller than a first value, a first multiplication unit for multiplying signals received by the signal reception end with the data stream outputted from the control unit, a high pass filter unit for discarding a DC portion of signals outputted from the first multiplication unit, and a second multiplication unit for multiplying the data stream outputted from the control unit with signals outputted from the high pass filtering unit and outputting a multiplied result to the signal reception end.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
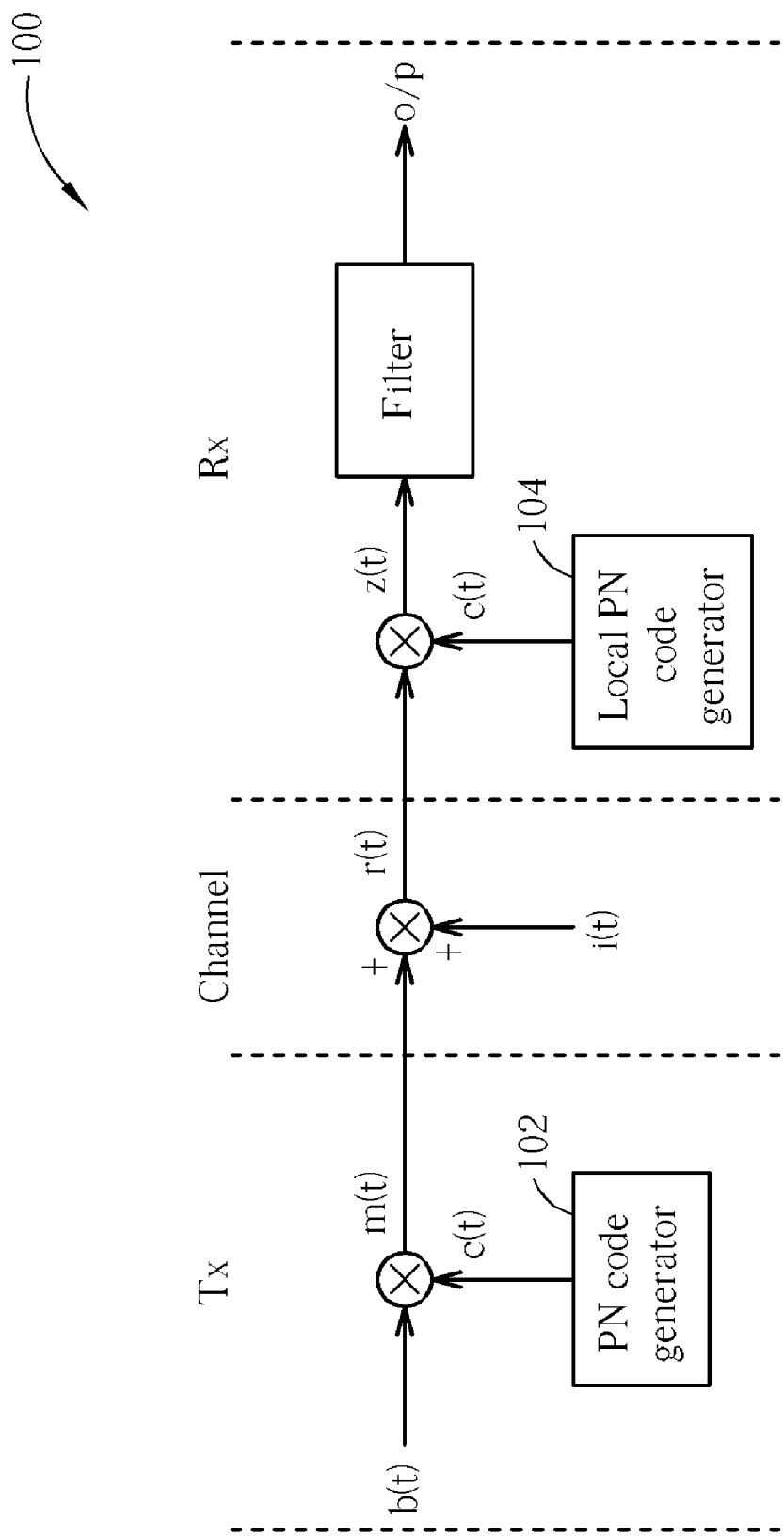
FIG. 1 illustrates a schematic diagram of a prior art code division multiple access system.

In a code division multiple access communication system, each PN code is only related to itself. The present invention uses this characteristic to enhance receiving efficiency of a receiver. First, please refer to FIG. 1, which illustrates a schematic diagram of a prior art code division multiple access system 100. In a transmitter, data signal b(t) is multiplied by a PN code signal c(t) generated by a PN code generator 102, so that a modulated signal m(t) outputted from the transmitter is:

$$m(t)=b(t)\times c(t)$$

According to the Fourier transformation theorem, a frequency spectrum of two multiplied signals is equal to a convolution result between frequency spectrums of the two signals. Since the data signal b(t) is a narrow-band signal, and the PN code signal is a wide-band signal, a frequency spectrum of the modulated signal m(t) approximately equals to a frequency spectrum of the PN code signal c(t). That is, the modulated signal m(t) is also a wide-band signal. After the transmitter transmits the modulated signal m(t) into a channel, the modulated signal m(t) is interfered with by a channel noise signal i(t), and a reception signal r(t) received by a receiver becomes:

$$r(t)=m(t)+i(t)$$

$$=b(t)\times c(t)+i(t)$$

In order to demodulate the reception signal r(t), the receiver includes a local PN code generator 104 for outputting the same PN code signal, c(t), as the PN code generator 102 outputs. The PN code signal c(t) outputted from the local PN code generator 104 is multiplied by the reception signal r(t), and a demodulated signal z(t) is gained:

$$z(t)=c(t)\times r(t)$$

$$=c^2(t)\times b(t)+c(t)\times i(t) \quad \text{Eq. 1}$$

An ideal PN code signal is related to itself, meaning that the PN code signal multiplied by itself in the time domain is a constant (ex. 1) in the time domain, or an impulse signal in the frequency domain. That is, $$c^2(t)=1, \text{ for all t}$$

Then, Eq. 1 can be simplified as $$z(t)=b(t)+c(t)\times i(t)$$

Therefore, the demodulated signal z(t) includes the pure data signal b(t) and a multiplied signal between the noise signal i(t) and the PN code signal c(t). Because the data signal b(t) is a narrow-band signal, and the multiplied signal between the noise i(t) and the PN code signal c(t) is a wide-band signal, a great portion of (c(t)×i(t)) can be discarded if a proper filter is used, and the data signal b(t) can be regained.

Figure 2:
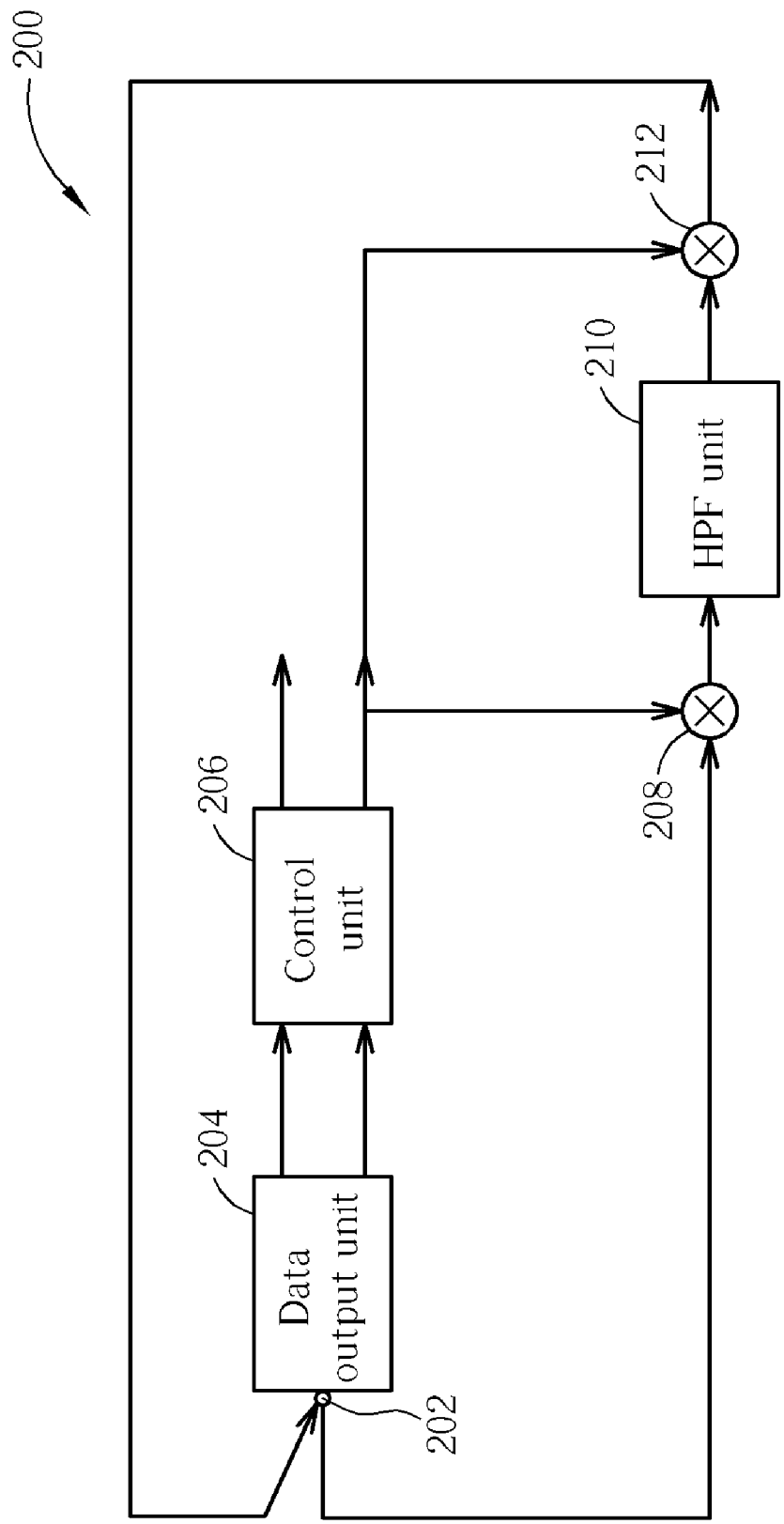
FIG. 2 illustrates a schematic diagram of a receiver capable of enhancing receiving efficiency in a code division multiple access communication system in accordance with the present invention.

Please refer to FIG. 2, which illustrates a schematic diagram of a receiver 200 capable of enhancing receiving efficiency in a code division multiple access communication system in accordance with the present invention. The receiver 200 includes a signal reception end 202, a data output unit 204, a control unit 206, a first multiplication unit 208, a high pass filter unit 210, and a second multiplication unit 212. The receiver 200 further includes an antenna and an analog to digital converter not shown in FIG. 2, utilized for receiving wireless signals and transforming the received wireless signals into digital signals to the signal reception end 202. According to signals received by the signal reception end 202, the data output unit 204 outputs a plurality of data streams corresponding to a plurality of (PN) codes to the control unit 206. The control unit 206 is utilized for outputting a data stream having maximum signal power to the first multiplication unit 208 when an amount of the plurality of data streams is smaller than a first value. In addition, the control unit 206 can transmit the plurality of data streams outputted from the data output unit 204 to a signal processing unit (not shown in FIG. 2) for performing signal processing. The first multiplication unit 208 multiplies signals received by the signal reception end 202 with the data stream outputted from the control unit 206, and outputs a result to the high pass filter unit 210, so as to discard a DC portion of signals outputted from the first multiplication unit 208. Then, the second multiplication unit 212 multiplies signals outputted from the high pass filter unit 210 with signals outputted from the control unit 206, and feeds back the result to the signal reception end 202. In other words, if the amount of the data streams outputted from the data output unit 204 is smaller than a specified value, the control unit 206 transmits a data stream having the maximum signal power among the data streams to the first multiplication unit 208. The first multiplication unit 208 multiplies signals received by the signal reception end 202 with the data stream having the maximum power, an auto-multiplication signal of the data stream and a multiplied signal between the data stream and other data streams can be gained. Since an auto-multiplication signal of a PN code is a constant in the time domain, the high pass filter unit 210 can discard the constant portion, which is in base band. Signals outputted from the high pass filter unit 210 multiplied by the data stream having the maximum signal power are signals without the data stream having the maximum power. Therefore, the receiver 200 can output data streams having weaker signal power according to the result of the second multiplication unit 212.

Figure 3:
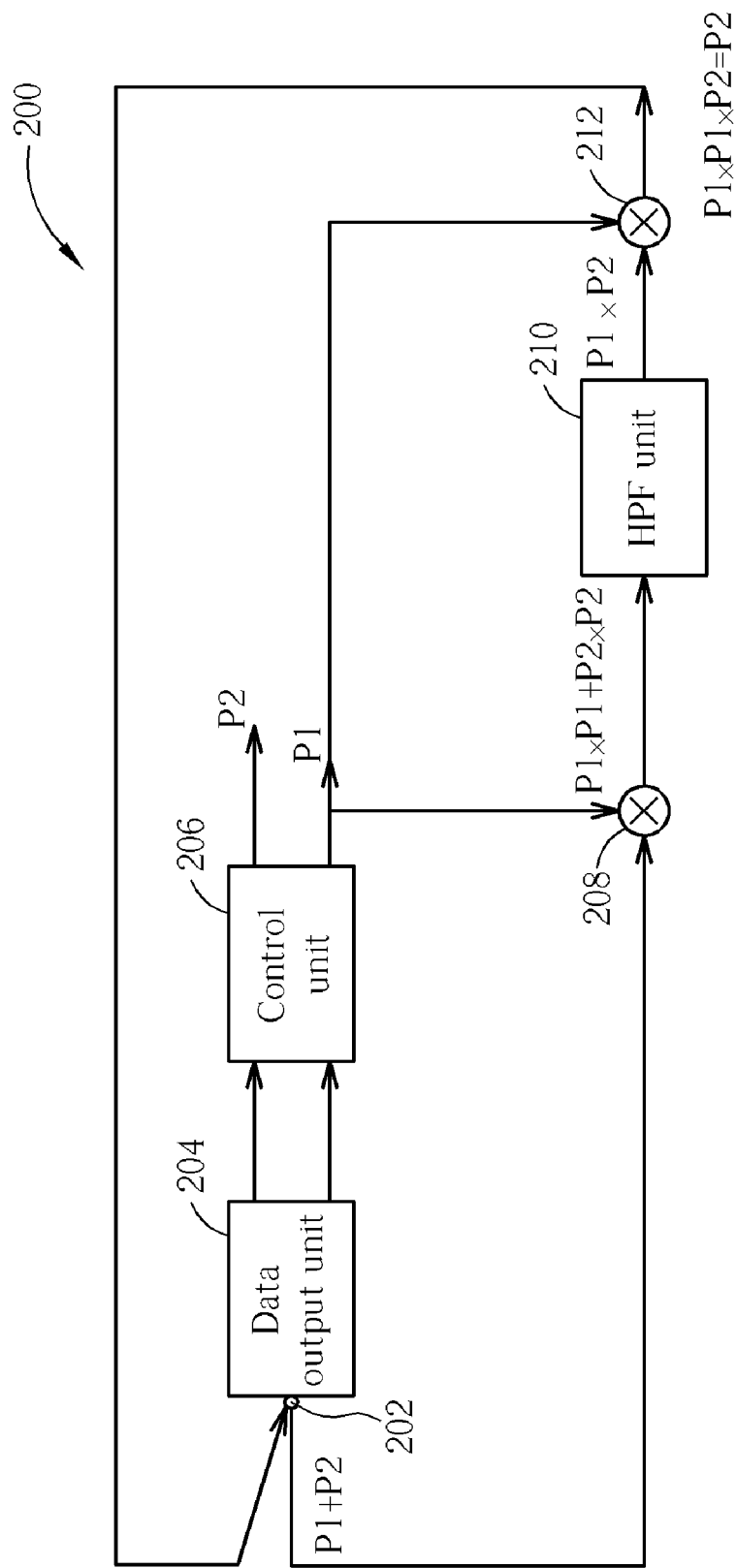
FIG. 3 illustrates an exemplary diagram of operations of the receiver shown in FIG. 2.

For example, please refer to FIG. 3, if signals received by the signal reception end 202 are data streams P1 and P2, where signal power of the data stream P1 is stronger than that of the data stream P2, the data output unit 204 can output the data stream P1 first. If a needed data stream amount is 2, then the control unit 206 transmits the data stream P1 to the first multiplication unit 208. Therefore, the first multiplication unit 208 outputs a result of (P1×P1+P1×P2). Since the portion of P1×P1 is equal to a constant, the high pass filter unit 210 outputs (P1×P2), and the second multiplication unit 212 outputs the data stream P2 to the signal reception end 202. As a result, the data output unit 204 can output the data stream P2 without being affected by the data stream P1.

As mentioned above, in the GPS, each satellite performs a convolution operation between a navigation data and a C/A code, and modulates the result to a carrier, and a GPS receiver requires at least four satellite signals. If one satellite signal received by the GPS receiver is stronger than other signals, the prior art receiver suffers the near-far problem. In the present invention, the receiver 200 demodulates and gets the satellite signal having stronger power (ex. P1 in FIG. 3) first, and discards the stronger signal through the first multiplication unit 208, the high pass filter unit 210, and the second multiplication unit 212, so as to demodulate and get signals having weaker power (ex. P2 in FIG. 3). Therefore, when a user navigates using a vehicle GPS receiver designed according to the receiver 200 in downtown, the receiver 200 can prevent the near-far problem and navigate correctly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A receiver capable of enhancing receiving efficiency in a code division multiple access communication system comprising:

a signal reception end for receiving signals;

a data output unit for outputting a plurality of data streams corresponding to a plurality of codes according to signals received by the signal reception end;

a control unit for outputting a data stream having maximum signal power when an amount of the plurality of data streams is smaller than a first value;

a first multiplication unit for multiplying signals received by the signal reception end with the data stream outputted from the control unit;

a high pass filter unit for discarding a DC portion of signals outputted from the first multiplication unit; and a second multiplication unit for multiplying the data stream outputted from the control unit with signals outputted from the high pass filtering unit and outputting a multiplied result to the signal reception end.

2. The receiver of claim 1, wherein the data output unit is utilized for outputting the plurality of data streams corresponding to the plurality of codes according to a correlation value between signals received by the signal reception end and the plurality of codes.

3. The receiver of claim 1, wherein the control unit is utilized for outputting the data stream having maximum signal power according to a correlation value between signals received by the signal reception end and the plurality of codes.

4. The receiver of claim 1, wherein the control unit is utilized for outputting the data stream having maximum signal power when the amount of the plurality of data streams is smaller than 4.

5. The receiver of claim 1, wherein the control unit is further utilized for outputting the plurality of data streams outputted from the data output unit to the signal processing unit for performing signal processing.

6. The receiver of claim 1 further comprising:

an antenna for receiving radio signals; and an analog to digital converter coupled to the antenna and the signal reception end for transforming radio signals received by the antenna into digital signals, and transmitting the digital signals to the signal reception end.

7. The receiver of claim 1, wherein the code division multiple access communication system is a $3^{rd}$ generation mobile communication system.

8. The receiver of claim 1, wherein the code division multiple access communication system is a global positioning system.

* * * * *